United States Patent [19]
Glaser

[11] Patent Number: 4,897,324
[45] Date of Patent: Jan. 30, 1990

[54] HERMETICALLY-SEALED ALKALINE BATTERY

[75] Inventor: Helmut Glaser, Singapore, Singapore

[73] Assignee: Varta Batterie Aktiengesellschaft, Hanover, Fed. Rep. of Germany

[21] Appl. No.: 211,987

[22] Filed: Jun. 27, 1988

[30] Foreign Application Priority Data

Aug. 20, 1987 [DE] Fed. Rep. of Germany ....... 3727766

[51] Int. Cl.$^4$ .................. H01M 4/32; H01M 6/04
[52] U.S. Cl. ................... 429/206; 429/222; 429/223
[58] Field of Search ............. 429/60, 223, 222

[56] References Cited

U.S. PATENT DOCUMENTS

| | | | |
|---|---|---|---|
| 2,934,581 | 4/1960 | Dassler | 429/60 |
| 3,775,273 | 11/1973 | Haines et al. | 429/228 X |
| 3,870,562 | 3/1974 | Catherino | 429/223 X |
| 3,951,686 | 4/1976 | Ness et al. | 429/223 X |
| 4,415,636 | 11/1983 | Charkey | 429/223 X |

FOREIGN PATENT DOCUMENTS

3534758  4/1987  Fed. Rep. of Germany.

Primary Examiner—Stephen J. Kalafut
Attorney, Agent, or Firm—Weiser & Stapler

[57] ABSTRACT

Alkaline Ni/Cd round cells (button cells) which are able to withstand long-term overloading with a relatively high current (five-hour current) for a practically unlimited time and still deliver approximately their rated capacity on discharge with an equal current after 12 months. The button cells of the invention comprise a negative electrode tablet provided with an auxiliary electrode comprising activated carbon integrated in the nickel wire gauze basket and a positive electrode constituted of a material which contains 20 wt. % to 35 wt. % metallic nickel as the second largest component of the mixture after Ni(OH)$_2$, while the otherwide common conductive graphite is absent.

10 Claims, 1 Drawing Sheet

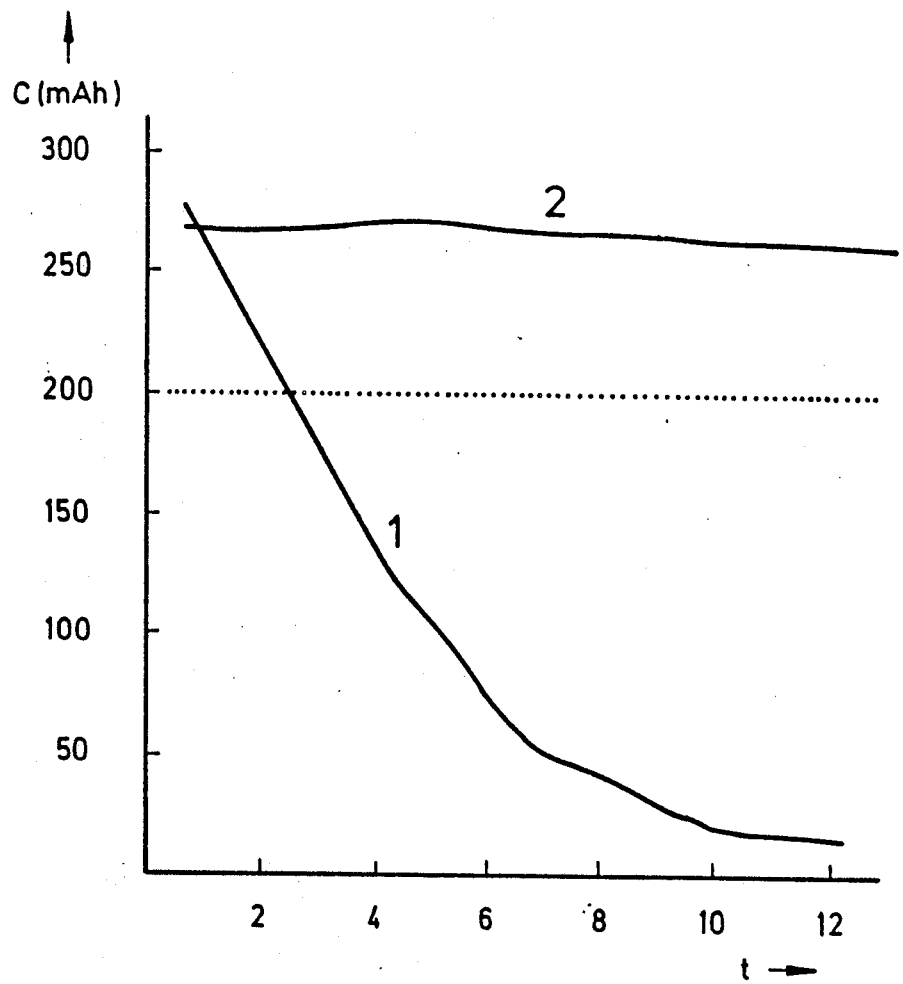

HERMETICALLY-SEALED ALKALINE BATTERY

BACKGROUND OF THE INVENTION

The present invention relates generally to sealed alkaline batteries of the round cell type (i.e., button cells) which comprise a positive nickel hydroxide electrode and a negative cadmium electrode, each generally having the shape of a pressed powder tablet in a metal wire gauze envelope.

Round cells, especially of the Ni/Cd type, are extensively used for energy supply in electronic entertainment devices to operate miniature motors (e.g., in electric shavers, in hobby tools or in pattern making). Being mass-produced articles, the technology for manufacturing such cells is presently so highly efficient that further improvements in quality hardly seem possible without a simultaneous increase in manufacturing costs. What is more, normal practical requirements are satisfied by the round cells which are presently commercially available.

A state of the art Ni/Cd round cell generally makes use of a positive housing cup and a negative cover, both of which are made from deep-drawn sheet steel and lined with a nickel layer having a thickness of about 5 $\mu$m. A sealing ring made of plastic, which also serves to ensure electrical insulation of the cup from the cover, is located in the closure zone which is formed by beading the edge of the cup over the edge of the cover.

The interior of the housing is essentially filled by two paste electrodes which are enclosed as pressed tablets in a fine-meshed metal wire gauze, preferably formed of nickel. The separator, which is made from a nonwoven plastic and impregnated with an alkaline electrolyte, is located between the positive and negative electrode tablets. A uniform contact resistance between the electrodes and the housing is maintained by a corrugated contact spring on the outermost side of the negative electrode.

To prevent gas from accumulating in the cell during cyclic charge/discharge operations, the negative electrode is usually designed to have a larger capacity than the positive electrode (the positive electrode therefore determines the useful capacity of the cell). Part of this negative excess capacity provides a so-called charge reserve consisting of excess cadmium hydroxide, which can be charged and transformed into metallic cadmium. Oxygen evolving from the electrode is taken up by the presently charged portion of the negative electrode, while $Cd(OH)_2$ is formed at the same rate at which new $Cd_{met.}$ is formed from the charge reserve during further charging. In this manner, the cell is protected from overloading.

The other portion of the negative excess capacity occurs as metallic cadmium in the normally discharged state of the cell (i.e., after exhaustive discharge of the positive electrode) and thus forms a presently available negative discharge reserve. However, concurrently with this discharge, the current which continues to flow in the discharge direction tends to cause electrolytic decomposition of water (forming $H_2$) at the positive $Ni(OH)_2$ electrode which cannot be further reduced. This leads to the formation of a hydrogen electrode having a potential which is more negative than that of the cadmium electrode, instead of a nickel hydroxide electrode. To prevent the risks which this involves, such as pole reversal of the cell and gas pressure build up, the positive electrode paste is provided with an additive in the form of $Cd(OH)_2$, a so-called antipolar paste (i.e., with a material which is reducible at the same potential as the potential of the negative electrode). This material must be coordinated with the discharge capacity of the negative electrode so that this capacity is exhausted and produces oxygen only if part of the anti-polar additive has transformed into $Cd_{met.}$. Under these circumstances, the oxygen can be reduced as in the case of overcharging at the potential for $Cd/Cd(OH)_2$. The cell is therefore also protected from pole reversal.

With a total positive to negative capacity ratio which is once and for all set by an appropriate pretreatment of the electrode, and with the mutually coordinated capacities of the charge reserve portions, the discharge reserve and the antipolar paste, the sealed round cell is able to reliably operate under all usual operating conditions, since the balance of the capacity portions (the so-called cell balance) is not disturbed in a lasting manner.

However, this is not true under extreme loads (e.g., in the case of rapid charging with high currents) since the oxygen consumption at the negative electrode is lower than the rate of formation at the charged positive electrode during the overloaded phase, and the original balance is shifted to the detriment of the charge reserve.

DE-OS No. 35 34 758 discloses that an electrocatalytic active material can be used as an auxiliary electrode with the negative electrode to improve the reduction of oxygen. However, the use of an auxiliary electrode is not successful if complete consumption of the gas takes place, even in the case of overload. Such a requirement is now of great interest for batteries used in practice due to the increasing use of cordless television sets, to permit them to remain operational for several months.

SUMMARY OF THE INVENTION

It is therefore the principal objective of the present invention to provide a round (i.e., button) cell which accommodates practically unlimited long-term overload with increased current because its useful capacity does not appreciably decrease as a result of such use, and because it has improved temperature characteristics and high current capacity.

This and other objectives are achieved in accordance with the present invention by providing a positive electrode paste which exclusively comprises nickel powder instead of the conductive graphite or other equivalent conductive materials which are used in conventional pastes. A nickel powder of suitable quality contains, for example, INCO nickel powder 255. It has been found that a Ni/Cd round cell has a considerably higher overload protection and an improved high current capacity if it has a positive electrode of this special paste composition, in addition to a negative electrode which is provided with an auxiliary electrode.

For further detail regarding preferred round cell constructions in accordance with the present invention, reference is made to the detailed description which follows, taken in conjunction with the accompanying Figure which shows a graph illustrating the improved performance characteristics of such round cells.

DETAILED DESCRIPTION OF PREFERRED EMBODIMENTS

In accordance with the present invention, the powder mixture of the positive electrode comprises 45 wt.% to 55 wt.% nickel hydroxide, 20 wt.% to 35 wt.% nickel, 8 wt.% to 12 wt.% cadmium hydroxide and 6 wt.% to 10 wt.% cadmium. Preferred percentages are 48 wt.% to 52 wt.% nickel hydroxide, 28 wt.% to 32 wt.% nickel, 10 wt.% to 12 wt.% cadmium hydroxide, and 8 wt.% to 10 wt.% cadmium. A particularly advantageous mixture contains about 49 wt.% nickel hydroxide, 31 wt.% metallic nickel, 11 wt.% cadmium hydroxide and 9 wt.% $Cd_{met.}$.

The negative electrode of the cell has a conventional composition comprising 60 wt.% to 75 wt.% cadmium hydroxide, 15 wt.% to 25 wt.% cadmium and 8 wt.% to 12 wt.% nickel powder. However, in accordance with the present invention, a coating comprising a mixture of activated carbon, conductive carbon black and a hydrophobic binder is applied to the cover of the nickel wire gauze envelope (basket) for the negative electrode. Due to the direct electron-conducting contact with the principal electrode, this layer acts as an auxiliary electrode, whose practically polarization-free surface is the preferred site of oxygen consumption.

Reliable operation of the cell according to the present invention is assured, as with round cells in general, by a proper cell balance. In connection with the cell construction of the present invention it has proved to be particularly favorable to design the negative electrode capacity to be twice the useful capacity of the positive electrode. Fifty percent of the negative surplus capacity accounts for the charge reserve and fifty percent of the negative surplus capacity accounts for the discharge reserve. The capacity of the positive electrode is enlarged by the antipolar $Cd/Cd(OH)_2$ paste, which has a capacity of 30% to 50% of the useful positive capacity.

A predetermined breaking point is provided on the housing, in known manner, to prevent the round cell of the present invention from bulging due to the build-up of an extremely high inner pressure as a consequence of malfunction. The predetermined breaking point preferably takes the form of a groove-shaped area of reduced (housing) wall thickness, located approximately in the center of the bottom or the cover, and is preferably designed as a polarity symbol (+ or − sign) or firm logo.

The composition of the positive electrode with respect to nickel hydroxide, nickel, cadmium hydroxide and cadmium, and their relative proportions as disclosed herein, are optimum ranges for optimum performance of the cell. Modest variations above or below the ranges specified are not expected to adversely affect the performance of the battery. Accordingly, one skilled in the art will generally prefer to use the ingredients specified in the amounts set forth herein.

It was found that due to the measures taken according to the present invention (i.e., with a known auxiliary electrode that is electrically short-circuited with the negative principal electrode, in combination with a novel positive electrode), the round cells can now be permanently overloaded for a practically unlimited period of time with currents on the order of magnitude of a five-hour current ($I=0.2$ CA). Round cells previously could only be loaded with currents corresponding approximately to the ten-hour current ($I=0.1$ CA) for overload periods of up to 1,000 hours (~42 days) without being damaged. In addition, it was found to be possible to expand the permissible temperature range for the discharge by a 10° C. increase (i.e., to the range of −20° C. to 60° C.). In contrast, the previously permissible temperature range during charging for prior-art round cells was from 0° C. to 45° C., and the rate of spontaneous discharge equalled 15% per month.

The superiority of round cells according to the present invention to previously available Ni/Cd round cells, in terms of their capacity characteristics for long-term overload, was demonstrated in an experiment in which commercially available cells having a rated capacity of 250 mAh (250 DK) and cells modified according to the present invention (novel composition of the positive electrode tablet and envelope [basket] of the negative electrode prepared as an auxiliary electrode) were subjected to long-term overloading with a five-hour current ($I=0.2$ CA) over a 12-month period. The cell housings were identical in the two experimental series, with dimensions (diameter × height) of 25.1×8.8 mm.

The changes in capacity under the effect of the same (five-hour) long-term overloading current were monitored by discharge tests on cells taken from the experimental series at monthly intervals, which were discharged with $I=0.2$ CA to a final discharge voltage of 1 V and then recharged with $I=0.2$ CA. A capacity limit of 200 mAh, below which the cell should not drop before the end of one year, was set as the criterion for successfully passing the long-term overload test. Furthermore, the change in the height of the cell as a consequence of stagnant internal pressure was not allowed to exceed the manufacturing tolerance, which was satisfied at least in the case of the experimental cells according to the present invention.

The result of the long-term overload test is graphically shown in the attached Figure, which shows the cell capacity C in mAh (valid for the discharge current of $I=0.2$ CA) against the overload time t in months, at a continuous current of $I=0.2$ CA. Curve 1, representing mean values of the discharge test on 250 DK experimental cells manufactured under standard conditions, shows the decline of the capacity of these cells as a consequence of retarded gas consumption, since the oxidation of the oxygen at the negative cadmium electrode is unable to keep pace with the rate of oxygen formation at the five-hour overload current, and the cell balance originally established is thus lost. The cells no longer met the capacity specified, even after a long-term overload for ¼ year, and were totally unfit for use after one year. Recharging was then impossible.

The round cells according to the present invention are represented by Curve 2, showing a virtually steady horizontal course. Consequently, these cells were fully able to handle the large amounts of gas to be converted due to the interaction of the negative auxiliary electrode and the modified positive paste. The charge capacity, as such, was also greatly improved by the combination of measures taken in accordance with the present invention, since the electrochemical conversion of the positive active material is kinetically much less inhibited and therefore more efficient in the presence of an exclusively metallic powdered conductive agent.

Consequently, Curve 2 clearly shows the ability of Ni/Cd round cells according to the present invention (here of the 250 DK format) to hold their initial capacity under long-term charging conditions at a relatively high current ($I=0.2$ CA) for a practically unlimited period of time. At any rate, the required minimum capacity of 200 mAh is still reliably available at a five-hour discharge after 12 months. Cycling tests of the novel round cells revealed that at least the same cycle life is reached as with the comparable prior-art round cells.

Finally, it should be pointed out as another advantage of the present invention that the "packaging" of such cells (i.e., the cell housing and the design) is unchanged compared to the commercially available round cells representing the present state of the art, and that equipping the cadmium electrode of the present invention with the gas consumption electrode, as well as the changeover of the positive electrode to the novel paste formula, requires a minimum amount of extra effort from the viewpoint of manufacture.

It will be understood that various changes in the details, materials and arrangement of parts which have been herein described and illustrated in order to explain the nature of this invention may be made by those skilled in the art within the principle and scope of the invention as expressed in the following claims.

We claim:

1. An improved sealed alkaline battery of the button cell type with a positive nickel hydroxide electrode and a negative cadmium electrode, each having the form of a pressed powder tablet in a metal wire gauze envelope, which cell is capable of long-term overloading and increased charge capacity and comprises a positive electrode of a powder material of a mixture of 45 wt.% to 55 wt.% of nickel hydroxide, 20 wt.% to 35 wt.% of nickel, 8 wt.% to 12 wt.% of cadmium hydroxide, 6 wt.% to 10 wt.% of cadmium, which mixture is free of conductive graphite, wherein in the positive electrode the cadmium/cadmium hydroxide has a capacity of 30 to 50% of the useful positive capacity and the negative electrode is electrically short-circuited with an auxiliary electrode to electrochemically reduce the oxygen pressure.

2. The battery of claim 1 wherein the negative electrode has a capacity twice the useful capacity of the positive electrode.

3. The battery of claim 1 wherein the material of the negative electrode is a powder mixture of 60 wt.% to 75 wt.% of cadmium hydroxide, 15 wt.% to 25 wt.% of cadmium and 8 wt.% to 12 wt.% of nickel.

4. The battery of claim 3 wherein the auxiliary electrode is formed by a coating of the cover of the envelope of the negative electrode with a mixture of activated carbon, conductive carbon black and hydrophobic binder.

5. The battery of claim 1 wherein the envelope of the negative electrode is a wire gauze.

6. The battery of claim 1 wherein a predetermined breaking point in the form of a groove-shaped area of reduced housing wall thickness is provided on the round cell housing.

7. The battery of claim 2 wherein around 50% of the surplus capacity of the negative electrode over the positive electrode accounts for the charge reserve and around 50% of the negative surplus capacity of the negative electrode over the positive electrode accounts for the discharge reserve.

8. The battery of claim 5 wherein the wire gauze is formed of nickel.

9. An improved sealed alkaline battery of the button cell type with a positive nickel hydroxide electrode and a negative cadmium electrode, each having the form of a pressed powder tablet in a metal wire gauze envelope, which cell is capable of long-term overloading and increased charge capacity and comprises a positive electrode of a powder material of a mixture of 45 wt.% to 55 wt.% of nickel hydroxide, 20 wt.% to 35 wt.% of nickel, 8 wt.% to 12 wt.% of cadmium hydroxide, 6 wt.% to 10 wt.% cadmium, which mixture is free of conductive graphite and a negative electrode of a powder material of a mixture of 60 wt.% to 75 wt.% of cadmium hydroxide, 15 wt.% to 25 wt.% of cadmium and 8 wt.% to 12 wt.% of nickel wherein the negative electrode has a capacity around twice the useful capacity of the positive electrode and around 50% of the surplus capacity of the negative electrode over the positive electrode accounts for the charge reserve and around 50% of the negative surplus capacity of the negative electrode over the positive electrode accounts for the discharge reserve.

10. The battery of claim 9 wherein the negative electrode is electrically short-circuited with an auxiliary electrode to electrochemically reduce the oxygen pressure.

* * * * *